May 6, 1952     O. W. GREENE     2,595,671
CORROSION RESISTING SAFETY VALVE
Filed Sept. 14, 1946
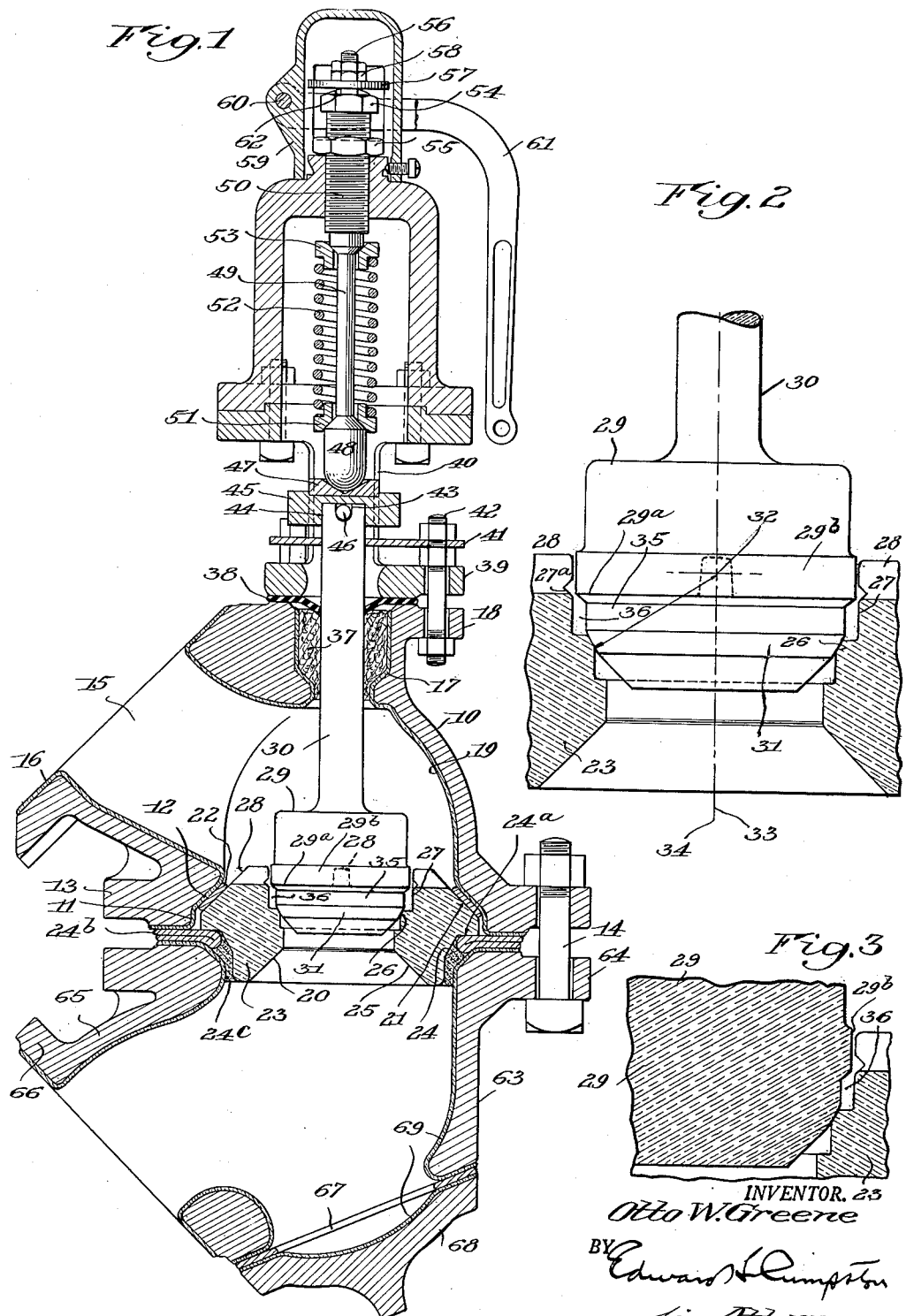
INVENTOR.
Otto W. Greene
BY Edward H. Cumpston
his Attorney Patented May 6, 1952

2,595,671

UNITED STATES PATENT OFFICE 2,595,671

CORROSION RESISTING SAFETY VALVE

Otto W. Greene, Brighton, N. Y., assignor to The Pfaudler Co., Rochester, N. Y., a corporation of New York Application September 14, 1946, Serial No. 697,071

3 Claims. (Cl. 137—53)

This invention relates to valves of the safety or pop variety, and more particularly to those of the type adapted for handling fluids of a corrosive character and embodying suitable provisions for resisting chemical attack by such fluids.

One object of the invention is to provide a valve of this character having its operating parts so constructed and arranged as to be effectively sealed off from the fluid passageways and protected against corrosive action of the transmitted fluids.

Another object is to provide such a valve with means by which the seating surfaces may be readily cleaned and lightly reground without removal from the housing and without detaching the valve housing from its connections.

Another object is to supply a valve of the above character having its stem so mounted as to be effectively guided in its movements and sealed in the housing with a minimum of frictional resistance, so as to be capable of responding accurately to the predetermined pressures at which it is intended to automatically open and close.

Another object is to provide such a valve having its inlet and outlet connections, valve parts, and operating means, all contained in a single housing adapted for assembly directly with the outlet of a container or other conducting means.

To these and other ends the invention resides in certain improvements and combinations of parts, all as will be hereinafter more fully described, the novel features being pointed out in the claims at the end of the specification.

In the drawings:

Fig. 1 is a central sectional elevation of a safety valve embodying the present invention;

Fig. 2 is an enlarged central sectional detail of portions of the valve seat ring shown in Fig. 1, and Fig. 3 is a similar view of the cooperating parts of the valve head and seat ring.

The preferred embodiment of the invention, herein disclosed by way of illustration, forms part of the disclosure of my copending patent application, Serial No. 500,669, filed August 31, 1943, now Patent No. 2,454,160, issued November 16, 1948, Corrosion Resisting Valves, of which the present application is a continuation in part. This embodiment comprises a main housing part, indicated generally at 10, Fig. 1, as a casting of steel or other suitable metal having the relatively thin and uniform cross sectional dimensions commonly employed in standard metal valves. Housing part 10 has an inlet opening 11 at one side thereof about which is formed an annular shoulder 12 inclined or flared outwardly toward said opening, at an angle to the axis of the opening of about 45°, as shown, to support and center a separately formed valve seat ring, as hereafter described. The housing is formed about said inlet opening with a flange 13 corresponding, in the present instance, to a standard four inch pipe flange provided with holes for attaching bolts 14. The housing comprises also a three inch outlet passage 15 provided with a flange 16 adapted for connection with a standard three inch pipe line flange. At 17 on the housing is a valve stem stuffing box terminating in a flange 18, for a purpose hereafter described. The inner surfaces of the housing part 10 are coated with a corrosion resisting material, such as the known vitreous or glass lining material indicated at 19.

The valve seat is provided on a separately formed annular ring 20 of ceramic material, preferably a good quality of porcelain, with a surface 21 flared outwardly or beveled at substantially the same angle as and seated on the shoulder 12 of the housing, with a thin pad gasket 22 of sheet packing interposed, as shown, to form a tight joint. Ring 20 is formed with substantial and strong portions, as shown, and preferably with a short sleeve portion 23 projecting outwardly somewhat beyond the flanged opening of housing 10, this projecting portion having an external annular recess 24 therein by which its outer diameter is reduced to less than that of the flanged opening of the housing, leaving an annular shoulder 24a for a purpose hereafter described. Projecting portion 23 has an outwardly flared end 25 adapted to be received within the conducting means with which part 10 is connected. The opposite side of the ring is formed, concentrically with its opening or port, with a narrow seat 26 above which is an annular recess 27 for a purpose hereafter described. At 28 on the upper surface of the ring are spaced lugs forming guides for the valve head. It will be noted that the seat ring generally has uniform cross sectional dimensions adapted to permit uniform expansion and contraction under variations in temperature.

The outwardly projecting seat ring shoulder 24a bears upon a thick, resilient gasket 24b of asbestos, rubber, or other known and suitable corrosion resisting material, interposed between the flange 13 of the housing part 10 and the cooperating flange of a conducting part, such as the flange 64 of a container outlet, or of a pipe line with which the housing part 10 is connected, as hereafter described. The projecting portion 23 of the seat ring is also spaced from the flange of the connected conducting part, as shown, and the intervening space may be filled with any known or suitable elastic cement 24c, so as to eliminate the recess or crevice. The seat ring is thus spaced from the surfaces of the housing part 10 and the conducting part with which it is connected and is held between the sheet packing 22 on the inclined shoulder 12 of housing part 10 and the resilient gasket 24b described above, so that any pressure applied to the porcelain seat ring by clamping together the flanges 13 and 64, is resiliently limited and applied normally to its surfaces, being of the compressive nature which the porcelain is well adapted to withstand. Excessive pressure between the flanges at any part of their peripheries tends to force that part of the seat ring inwardly and equalize the lateral pressure. Such minor lateral pressure against the ring is directed compressively inwardly against its convex periphery, in which direction also the ring is relatively strong. The moderate seating pressure of the valve head on the seat ring tends to press it against gasket 24b. Thus the pipe line stresses resulting from temperature changes, or the drawing together of joints, are taken mainly by the metal body portion without reaching the ceramic valve seat in any substantial force, so that the seat ring, in effect, has a floating support between the metal housing portions, and is centered against the inclined shoulder 12 of housing part 10.

The valve head 29 is formed on a stem or spindle section 30 mounted for longitudinal movement in the stuffing box 17 and extended through and above the latter for connection with actuating means hereafter described. This valve stem section is preferably made of a hollow metal rod and the stem and head have their exposed surfaces made of suitable corrosion resisting material. Preferably the stem is protected by a coating of glass or other vitreous material and the valve head is a separately formed body of ceramic material, as indicated in Fig. 3, having therein a socket in which the lower end of the valve stem is received and anchored with suitable cement, as more fully described in my said copending application. The valve head is formed with an active face or zone 31 for cooperation with the face of the seat 26 which is preferably about one-sixteenth of an inch wide. These mating faces are initially formed for convenience in manufacture as beveled or conical surfaces which, in view of their narrowness, are quickly ground into generally spherical shapes having a common center located substantially at 32 at an elevation about midway between the tops and bottoms of the guide lugs 28, so as to maintain tight closure of the valve head and seat in any position which the head may occupy as the result of any possible angular deflection of its axis 33 from axis 34 of the housing, as indicated in Fig. 2. The face of the valve head has an annular recess 35 therein, opposite the recess 27 in the seat ring, the top edge of which is ground to produce a slight bevel, as at 27a. The valve head has a shoulder 29a which lies opposite the beveled edge 27a in any slight angular deflection to which the valve stem may be subjected. These parts form a "huddling chamber" 36, as well understood in the art, for producing a "blow-down" of pressure and positive closing of the valve at the desired pressures.

The valve head surface 29b is slightly smaller in diameter than the diameter of the opening between the guide lugs 28, to afford a working clearance, and the mating seat and valve head surfaces 26 and 31, respectively, and the valve head shoulder 29a preferably lie substantially in a spherical surface having its center at 32 and falling tangent to the inner faces of the guide lugs 28 about midway between their tops and bottoms. With this arrangement, the mating surfaces of the valve head and seat remain in tightly fitting relation with each other and the shoulders 27a and 29a restricting the top of the huddling chamber maintain substantially the same overall average clearance around the valve head, in any slight angular deflection to which the valve stem may be subjected. In this way the valve stem and the porcelain valve head, seat and guide lugs are together maintained in proper working relation with one another, without reliance upon the equalizing of a seating valve disc directly at the region of the seat, as commonly depended upon in the construction of pop safety valves.

Valve stem section 30 is movably mounted in the housing by means specially adapted to maintain a minimum frictional resistance to its longitudinal movement, comprising loose barrier packing, such as loose asbestos material, 37, in the stuffing box 17 through which the valve stem may reciprocate with low frictional resistance. To seal the joint about the stem, as well as to retain the packing in the stuffing box, a flexible diaphragm 38 is secured on the top of the stuffing box as by clamping it between the outlet flange 18 of the housing and the bottom flange 39 of the valve bonnet 40. Diaphragm 38 is preferably formed of some suitable rubber-like material, such as flexible natural or artificial rubber, and has an opening closely embracing the enameled valve stem, under elastic tension, so as to seal the joint about the stem or spindle and also hold the loose packing in the stuffing box. The diaphragm flexes readily as the stem moves up and down so that the portions of the diaphragm adjacent the stem move with it, being shown in the drawing as inclined downwardly in following the downward seating motion of the stem. The packing 37 substantially retains the liquids and gases within the housing, while diaphragm 38 completes the seal and holds the packing in place, without substantial frictional resistance to the movement of the stem.

Such packing parts serve to mount and guide the stem but it is preferred to provide additional means for more closely confining and guiding the stem movements, comprising, in the present instance, a metal plate 41 having an opening in which the stem is closely but loosely fittted, the plate being supported at its edges by receiving the extended ends of bolts 42 which serve also for connecting the bonnet flange 39 to the flange 18 of the housing.

The invention comprises also a convenient and advantageous means for grinding in the valve parts, as well as regrinding them from time to time in operation. For this purpose the upper end of the stem or spindle section 30 is notched as at 43 and seated in a recess 44 in a knurled disk or hand wheel 45, which is notched at opposite sides of its recess for the reception of a rod or pin 46 engaged also in the slot 43 in the top of the stem, for rotating the stem on rotation of the wheel 45. The wheel is thus mounted on the top of the stem for reciprocation therewith during the opening and closing of the valve and furnishes a means for manually rotating or oscillating the stem while seated, to grind or regrind the valve parts.

The means for yieldingly holding the valve seated against normal pressures comprises preferably a disk 47 rotatably fittted in a shallow recess in the top of wheel 45. Disk 47 has a concavely shaped upper surface in which is rotatably seated the spherical lower end 48 of an upper stem or spindle section 49 reciprocating at its upper end in a sleeve 50 threadedly and adjustably engaged in an opening in the top of the bonnet. Riding loosely on the enlarged lower end 48 of this stem section is a collar 51 forming an abutment for the lower end of a coiled compression spring 52 surrounding the spindle and bearing at its upper end against a collar 53 seated against the lower end of the sleeve 50. The upper end of sleeve 50 has a nut-like head 54 by means of which the sleeve may be turned to adjust it longitudinally of the bonnet and so adjust the compressive force of the spring acting on the upper section 49 of the stem, disk 47, wheel 45, and the upper end of the lower section 30 of the spindle carrying the valve head, for urging the head toward its seat. At 55 is a locknut for locking the sleeve in longitudinally adjusted position on the bonnet.

Section 49 of the stem is extended upwardly through and beyond its adjusting sleeve 50, as at 56, and carries a washer 57 secured on the spindle by means of a pair of locknuts 58. A hood 59 on top of the bonnet encloses the above parts and furnishes a pivotal support 60 for a lever 61 which is branched outwardly from its pivot so as to loosely surround the hood. Each lever branch has thereon a shoulder, or lug, 62, engaging the under surface of washer 57, so that when the lever is lifted, it lifts stem section 49, to relieve the valve head from the downward pressure of spring 52.

The section 30 of the valve stem thus has a reciprocating motion, and also a rotary motion imparted by the hand wheel 45, for grinding the valve parts. During transportation and storage of the valve, the locknuts 58 are screwed down to hold the upper spindle section 49 up against the pressure of the spring 52 and so relieve the downward pressure of the valve head on the seat. In grinding the valve parts, the locknuts are backed off sufficiently to produce just enough downward pressure of the head on the seat to give some resistance to turning of the hand wheel 45 and afford good grinding engagement, the valve parts being previously wetted, as well understood in the art. In operation, the locknuts 58 are backed off further so that the full adjusted pressure of spring 52 is applied to the valve stem and head. The valve may be opened at any time by lifting the lever 61.

It will be evident that the valve parts may be ground in without removing the valve from the line, or loosening the bonnet from the valve, or detaching any parts other than the hood 59, and such grinding or regrinding of the parts may, in fact, be carried on while the valve remains in operation. It will be noted also that the valve spring and all of the operating parts are located above the packing 37 and sealing diaphragm 38 through which the glass coated stem extends, so as to be free from attack by corrosive liquids and gases passing through the valve. At the same time the coating of the valve stem section 30 is carried at least well above the diaphragm, so as to protect those portions of it which are subjected to corrosive conditions.

The invention also comprises features of housing construction by means of which the valve may be adapted for connection directly with the flanged outlet of a container, or for use either as a 90° angle or a straight line valve. Such means comprises the flange 13 which is adapted to be bolted directly to the outlet flange of a tank or other chemical container, as described in my said copending application. Flange 13 is also adapted for attachment, by means of the bolts 14, directly to a standard four inch flange of a lateral connection of a T section of a pipe, for example, or other conduit, and the invention further comprises a second housing part for adapting it for use as either a 90° angle valve, or a straight line valve, as may be desired. Such second housing part comprises a glass lined metal section 63, having a four inch flange 64 adapted to be bolted to flange 13 of the housing part 10, as described above. Housing part 63 is formed with a lateral inlet portion 65 having a three inch flange 66 for attachment to the flange of a standard pipe section. Inlet portion 65 and its flange 66 preferably have their axes arranged to intersect the axis of the valve stem at an angle of approximately 45°; and flanges 66 and 16 are preferably at such a distance from the axis of the valve stem that the valve with its inlet and outlet connections has the same dimensions from center line to flange face, as standard pipe elbows and other 90° angle sections, so as to be adapted for convenient use in any standard pipe line.

Housing part 63 may also be adjusted, relative to housing part 10, to form a straight line valve, by unbolting and turning it from the position shown to 180°, so that the axis of the inlet portion 65 is alined with the axis of the outlet portion 15 of the part 10. Such adjustability of housing parts 63 serves to standardize the valve for application, conveniently and economically, to various uses and associations.

The construction of housing part 63 affords the further advantage of increasing the accesibility of the interior parts of the valve. To this end the portion of housing part 63 lying substantially in line with the projected axis of the valve stem, is formed with a circular opening 67 normally closed by a cover plate 68 detachably secured to the housing by suitable bolts (not shown). In either of the described positions of adjustment of housing part 63, and while the valve remains connected in the pipe line, cover 68 may be removed and access thus obtained to the valve head and seat ring for inspecting or cleaning them. By this means of entry on one side of the valve seat, and the entry, if necessary, through the outlet port 15, on the opposite side of the seat, the interior parts of the valve are rendered conveniently accessible for the purposes described. The interior surfaces of housing part 63 and cover plate 68, like the housing part 10, are coated with any known or suitable vitreous enamel or glass lining 69 to protect the same against chemical attack, so that all of the surfaces of the valve parts which are subjected to the corrosive action of the fluids to be handled are made of materials adapted to durably resist such attack.

The invention thus affords an improved safety valve combining a number of advantageous features comprising, for example, a housing having the strength and compactness of metallic materials, combined with the high degree of protection against corrosive attack supplied by interior surfaces of ceramic materials. The valve head and seat ring which are subjected to the most severe wear, are separately formed of porcelain in such shape as to have substantially the compressive strength of metal. In addition, the seat ring has a floating type of support in the casing wall centered by the inclined shoulder on the housing, so that excessive pipe line stresses are carried by the housing rather than the seat ring, and such stresses as reach the seat ring tend to be equalized by the centering engagement of the ring with the housing. The valve stem or spindle is supported and guided by packing means which effectively seals its bearing in the housing against the escape of corrosive fluids, while supporting the stem with a minimum of resistance to its longitudinal movements in operation. At the same time, the section of the stem carrying valve head may be readily rotated with suitable pressure against the seat for grinding in the parts, without disassembly of the valve parts or of the valve from the line, and the housing is so constructed as to make it adaptable generally for connections requiring standard valve attachments and dimensions.

It will thus be seen that the invention accomplishes its purposes and while it has been herein disclosed by reference to the details of a preferred embodiment, such disclosure is to be taken in an illustrative, rather than a limiting sense, as it is contemplated that various changes and modifications will readily occur to those skilled in the art within the spirit of the invention and the scope of the appended claims.

I claim:

1. A safety valve comprising a valve body having a valve seat, a valve spindle and head movably mounted on said body, a stuffing box for said spindle in said body, loose barrier packing in said box about said spindle, a flexible diaphragm of rubber-like material at the outer end of said box and having an opening therein closely embracing said spindle for reciprocating movement therewith to seal said box, said spindle being longitudinally slidable in said packing with low frictional resistance, and spring means connecting said body and spindle for yieldably seating said head on said seat.

2. A safety valve comprising a housing having a valve seat, a valve stem having fixed thereon a valve head for cooperation with said seat, a stuffing box on said housing in which said stem is movably mounted, loose barrier packing in said box about said stem, a flexible diaphragm of rubber-like material on the outer end of said box and having an opening therein closely embracing said stem for reciprocating movement therewith to seal said box, a guide plate on said housing having an opening in which said stem is slidably guided, said stem being slidable in said housing with low resistance by said engaging parts, a bonnet secured on the outside of said housing, and spring means in said bonnet for resiliently resisting the opening movement of said stem under pressure in said housing.

3. A safety valve comprising a housing having a valve seat, a valve stem having fixed thereon a valve head for cooperation with said seat, a stuffing box on said housing in which said stem is mounted for rotary and longitudinal sliding movement, loose barrier packing in said box about said stem, a flexible diaphragm of rubber-like material on the outer end of said box and having an opening therein closely embracing said stem for reciprocating movement therewith to seal said box, a guide plate on said housing having an opening in which said stem is slidably guided, said stem being longitudinally slidable in said housing with low frictional resistance, a bonnet on the outside of said housing, manually operable means in said bonnet for rotating said stem independently of said bonnet to grind said valve head and seat, and spring means in said bonnet for resiliently resisting the opening movement of said valve.

OTTO W. GREENE.

REFERENCES CITED

The following references are of record in the file of this patent:

UNITED STATES PATENTS

| Number | Name | Date |
|---|---|---|
| 1,128,426 | Dunham | Feb. 16, 1915 |
| 1,460,628 | Wertz | July 3, 1923 |
| 1,573,304 | Darling | Feb. 15, 1926 |
| 1,596,047 | Kelly | Aug. 17, 1926 |
| 1,754,523 | Pope | Apr. 15, 1930 |
| 1,810,621 | Parks | June 16, 1931 |
| 1,840,904 | Julien | Jan. 12, 1932 |
| 1,923,306 | Hagen | Aug. 22, 1933 |
| 1,947,257 | Fritz | Feb. 13, 1934 |
| 1,960,335 | Finnie | May 29, 1934 |
| 2,030,771 | Still | Feb. 11, 1936 |
| 2,245,648 | Campbell | June 17, 1941 |
| 2,264,656 | Briscoe | Dec. 2, 1941 |
| 2,265,496 | Shaw | Dec. 9, 1941 |
| 2,304,784 | Donaldson | Dec. 15, 1942 |